United States Patent [19]

Koziol

[11] Patent Number: 4,598,693

[45] Date of Patent: Jul. 8, 1986

[54] MOVABLE SIGHT PANEL FOR COOKING APPARATUS

[75] Inventor: Walter Koziol, Antioch, Ill.

[73] Assignee: Modern Home Products Corp., Antioch, Ill.

[21] Appl. No.: 635,559

[22] Filed: Jul. 30, 1984

[51] Int. Cl.⁴ .......................... A47J 37/00; F24C 3/12
[52] U.S. Cl. .................. 126/41 R; 126/19 R; 126/200; 99/341
[58] Field of Search .............. 126/199, 19 R, 200, 126/213, 190, 198, 41 R; 99/341, 419, 421 H, 421 R; 220/89 R; 362/92, 253; D7/403, 405, 323, 402

[56] References Cited

U.S. PATENT DOCUMENTS

| | | | |
|---|---|---|---|
| D. 261,471 | 10/1981 | Koziol | D7/402 |
| 1,008,414 | 11/1911 | Jeavons | 126/200 |
| 1,729,948 | 10/1929 | Liptak | 126/200 |
| 1,973,171 | 9/1934 | Jacobi | 126/200 |
| 2,179,646 | 11/1939 | Spartalis | 99/341 |
| 2,478,253 | 8/1949 | Doner | 219/35 |
| 2,502,685 | 4/1950 | Warner | 99/421 HH |
| 3,049,073 | 8/1962 | Edelston | 99/446 |
| 3,379,190 | 4/1968 | Leach | 126/25 |
| 3,385,285 | 5/1968 | King | 126/200 |
| 3,667,648 | 6/1972 | Koziol | 220/41 |
| 4,170,173 | 10/1979 | Bradford | 99/341 |

Primary Examiner—James C. Yeung
Attorney, Agent, or Firm—Quarles & Brady

[57] ABSTRACT

A slidable sight panel for a cooking unit wherein the panel member is slidably positioned in a guide track over an opening in a cover member with one of the panel sections spaced away from the opening and another panel orientated with the opening. One of the panel members is transparent so that when it is orientated with the opening in the grill the contents inside the grill cover can be inspected. The other panel is usually of a nontransparent material and covers the opening when it is not necessary to view the contents of the grill. In this manner, the transparent section is kept clean from the smoke and grease which usually accompany cooking in a barbecue grill unit. A light source is mounted outside the cooking unit for illuminating the interior thereof through a window unit.

5 Claims, 5 Drawing Figures

MOVABLE SIGHT PANEL FOR COOKING APPARATUS

BACKGROUND OF THE INVENTION

This invention relates to a cooking apparatus such as a barbecue grill wherein the contents can be observed without opening the cooking apparatus. More particularly, it relates to an illumination source and a slidable sight assembly having a transparent section which in one stage will locate the transparent section out of communication with an opening in the cover for the purpose of keeping the transparent section clean and in another phase will orientate the transparent section with the cover opening so as to permit inspection of the contents of the barbecue grill.

Panel members or windows for cooking devices of the type concerned within this invention are described in U.S. Pat. Nos. 1,008,414; 2,478,253; 3,049,073 and 3,379,190. U.S. Pat. Nos. 2,478,253; 3,049,073 and 3,379,190 all describe window members for broilers or ovens which are of a permanently mounted type. In these constructions, the glass is fixed inside a frame and is not removable or slidable. In U.S. Pat. No. 1,008,414 glass panels are removed from an oven door. However, the removal can only be effected from inside the unit and no means are provided to retain the glass in the door except when the door is in an upright position.

There is not available a device for use in conjunction with a cooking apparatus such as a barbecue grill which will efficiently permit the viewing of the contents of the grill without continuous cleaning or manipulation. For example, in U.S. Pat. No. 3,667,648 there is a described slip out glass panel for use in connection with a grill member. However, it must be cleaned quite often in order to be operable.

In U.S. patent application Ser. No. 635,549 filed on even date hereof and entitled Sight Panel for Cooking Apparatus, there is disclosed by the same inventor a fixed sight panel with an illumination source and panel member.

It is an advantage of the present invention to provide a cooking apparatus wherein the contents can be observed without opening the apparatus. It is another advantage of this invention to provide a slidable panel member for a cover in a cooking apparatus which will remain clean and does not require constant cleaning and/or removal from the cooking apparatus. Other advantages are an illumination source in conjunction with a sight panel member for a barbecue grill unit as well as a sight panel member which can be manufactured at a minimum amount of cost, can be assembled to any standard barbecue grill unit and can be operated with a minimum amount of effort.

SUMMARY OF THE INVENTION

The foregoing advantages are accomplished and the shortcomings of the prior art are overcome by the present slidable sight panel for a cooking device wherein a cover member has an opening in the front panel. A slidable panel member has at least two spaced apart or laterally positioned panel sections each of which is of a dimension to cover the opening when in different positions. One of the panel sections is composed of a transparent material. Guide track means are disposed in conjunction with the cover opening to slidably position the transparent panel section over the opening in one stage and to position the other panel section over the opening in another stage so that the transparent panel section is away from the opening. Preferably, the sight panel is fabricated with both panel sections formed in a unitary panel member and with one of the panel members being of a heat resistant glass. The preferred guide track means include two oppositely spaced track members positioned on both sides of the opening and in a horizontal manner with respect to the normal operative position of the cover. Also preferably, the panel member is of a generally flat and rectangular configuration with the track members being generally Z-shaped in cross section. A handle member is conveniently positioned on the slidable panel member for purposes of orientating the transparent section into and out of communication with the opening in the cover. An illumination means is also provided in conjunction with the grill unit to illuminate a portion of the interior thereof so that the contents can be more easily viewed through the transparent panel section.

BRIEF DESCRIPTION OF THE DRAWING

A better understanding of the present slidable sight panel will be accomplished by reference to the drawing wherein.

DESCRIPTION OF THE PREFERRED EMBODIMENT

Figure 1:
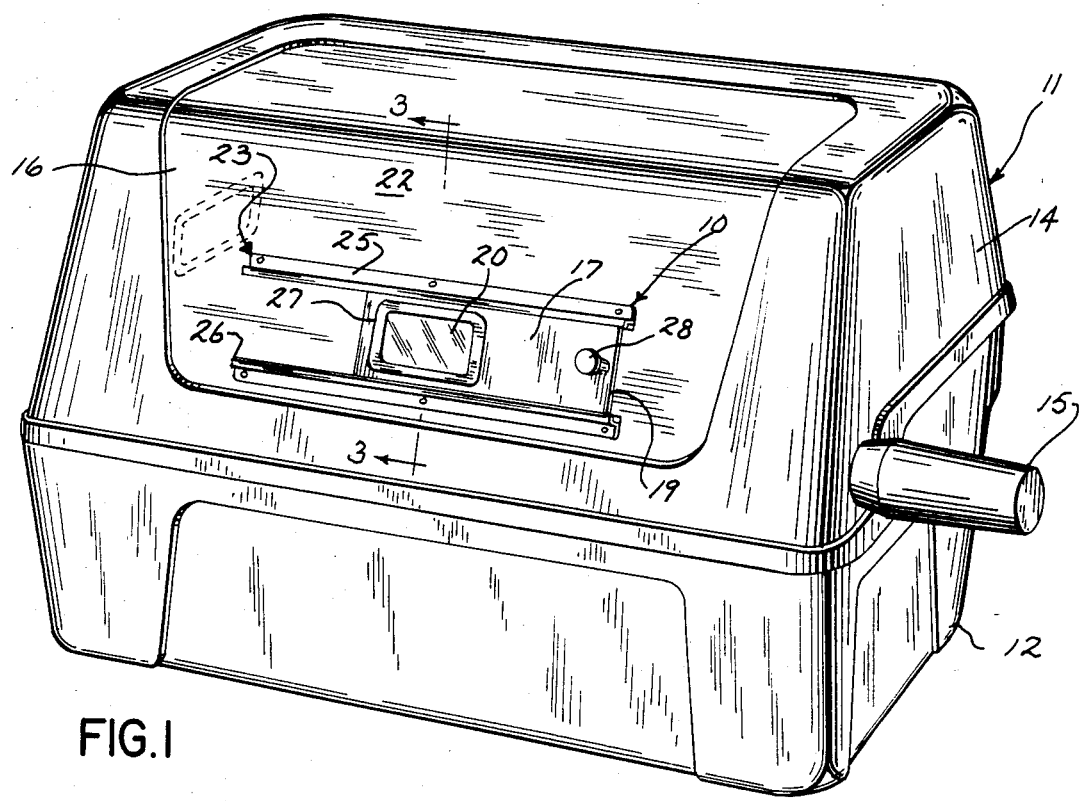
FIG. 1 is a perspective view of a barbecue unit showing the slidable sight panel in the front panel portion of the cover.
Figure 2:
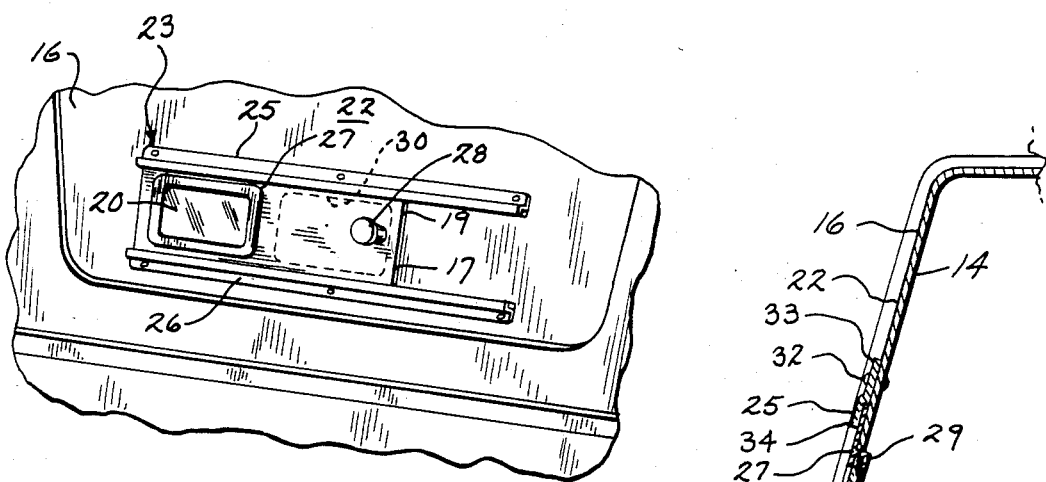
FIG. 2 is a partial perspective view showing the slidable panel member with the transparent portion out of communication with the opening in the cover.
Figure 3:
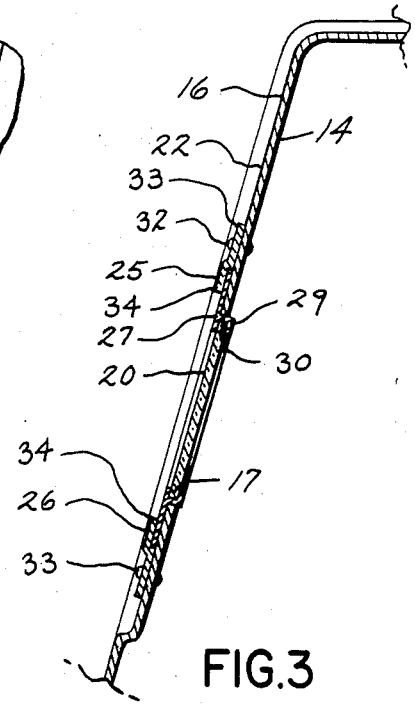
FIG. 3 is a view in vertical section taken along 3—3 of FIG. 1.

Proceeding to a detailed description of the present invention and as best seen in FIGS. 1-3 the sight panel assembly generally 10 is shown in conjunction with barbecue grill unit generally 11 having the usual base member 12 and a cover member 14 seated thereon. The usual handle 15 is also provided for opening the cover from its closed position shown in FIG. 1. A sight panel assembly 10 generally includes slidable panel 17 which has two unitary panel sections 19 and 20. Preferably, the panel section 20 will be transparent and composed of heat resistant glass. The slidable panel 17 is generally of a flat configuration and is rectangular. It will be guided in a guide track means generally 23 composed of the track members 25 and 26 which are positioned on either side of an opening 30 which is provided through front panel 16 of cover 14. This is best seen in FIG. 3.

Figure 4:
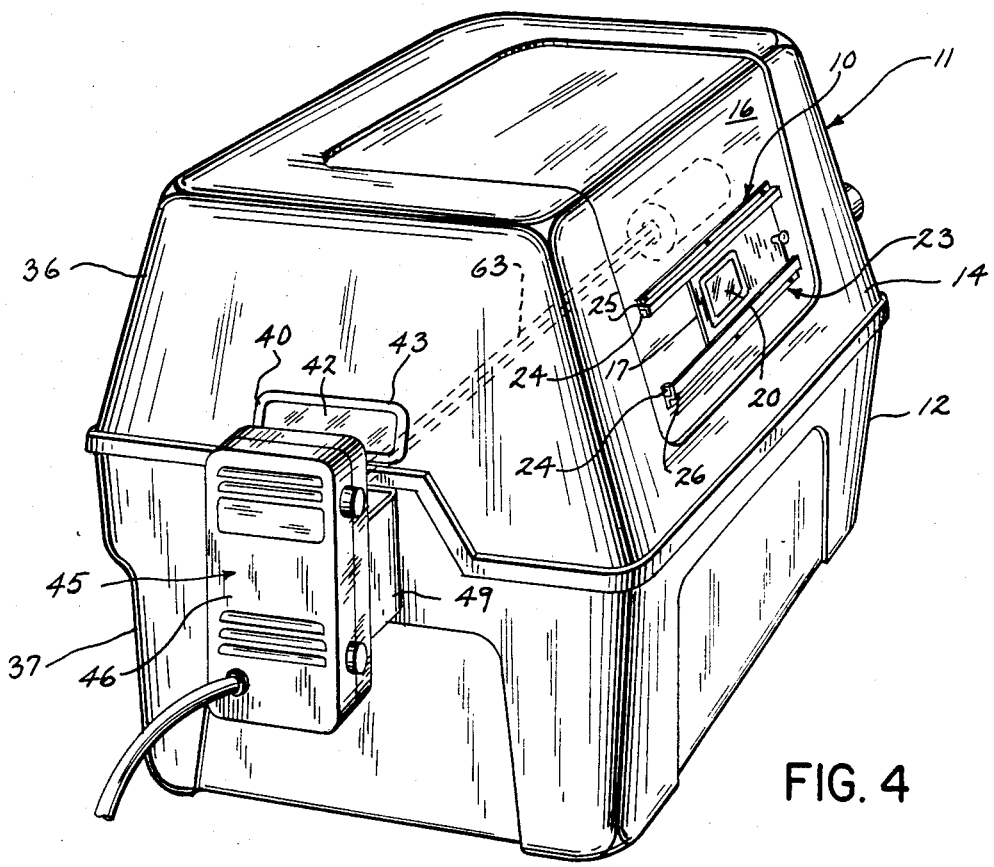
FIG. 4 is an end perspective view of the barbecue unit shown in FIG. 1 illustrating the means for illuminating the interior thereof.

The track members 25 and 26 are of a generally Z-shaped configuration with the inner flange portions 33 suitably connected to the cover 14 such as with the rivets 32. The outer flange portions 34 are spaced from the wall surface 22 of a front panel 16 to provide a suitable guide way for the slidable panel 17. The stop members 24 are disposed at one end of the track members 25 and 26 to prevent unintentional removal from one end thereof. This is best seen in FIG. 4. Referring back to FIG. 3, it will be seen that the slidable panel 17 is formed in part by a frame section 27 which has a rectangular channel 29 for holding the glass panel section 20 therein.

Figure 5:
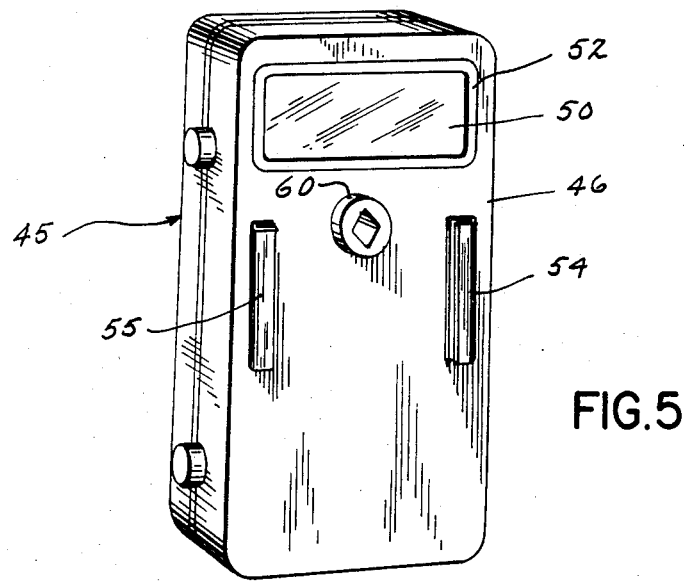
FIG. 5 is a perspective view of the combined illumination source and rotisserie drive shown in FIG. 4.

FIGS. 4 and 5 depict the means for illuminating the interior of the grill unit as well as provide a drive source for a rotisserie rod 63. A window 40 is provided in side panel 36 of the cover member 14 which consists of transparent panel 42 and frame 43. The panel 42 and the frame 43 is formed in the same manner as described for the slidable panel 17. Combined rotisserie and light source generally 45 includes a housing 46 in which is disposed an electric light bulb and a drive motor (not shown) which will be powered through an electric cord 47. Rotisserie and light source 45 will be mounted on a side panel 37 of the base member 12 through a bracket 49. As best seen in FIG. 5, the two flanges 54 and 55 will engage the bracket 49 for mounting purposes. A lens 50 is provided in the housing 46 and surrounded by a frame 52 to allow light to emit therefrom. A drive socket 60 having a square sided opening is rotatably mounted in the housing 46 for engagement with an end portion square sided rotisserie rod 63 and is driven by a drive motor in the housing 46. It should be pointed out that the illumination source and rotisserie drive is the subject of U.S. Pat. No. Des. 261,471.

OPERATION

A better understanding of the advantages of the sight panel assembly 10 will be had by a description of its operation. During the cooking of various products in a barbecue grill unit such as 11 it is often necessary to determine the condition of their cooking. Most barbecue grill units that are available today have no means of observing their contents without lifting the cover. The lifting of the cover wastes heat as well as can be a fire hazard if it is not done in the proper manner such as giving due consideration to grease which may be in contact with the heat source. Referring to FIG. 4, a light source will be illuminated in the housing 46 and will be emitted through the lens 50 and through the window 40 to illuminate the inside of the barbecue unit 11. In order to observe the contents of any product in the barbecue grill 11 all that is required is to position the transparent panel section 20 over the opening 30 in the cover member 14. In this manner one can view the inside of the grill unit. A handle 28 on the panel 17 affords this orientation.

When it is not required to observe the contents, the slidable panel 17 is moved to the position as indicated in FIG. 2 wherein the transparent section 20 is out of orientation and another panel portion 19 is positioned adjacent thereto and covers the opening 30. This is an important feature in having the glass panel 20 not orientated with the opening as it is not subject to the smoke and grease which normally will exit through the opening and contact the panel 17. Of course if the transparent panel 20 were so orientated it would be covered with the grease and smoke. The previously described displacement of the panel 20 during nonviewing avoids having to constantly clean the transparent section 20. Although, if this is required all that is required is to move the glass panel 17 away from stops 24 and out of contact with the guide track means for cleaning and subsequent orientation therein.

In the preferred embodiment, two panels, such as indicated by the numerals 20 and 19, are utilized for purposes of allowing the transparent panel 20 to be held out of position and in a clean state when not being utilized for viewing purposes. It is obvious that any number of such panels could be employed for selective positioning over an opening in a cover member. The guide tracks 25 and 26 are shown positioned in a horizontal manner with respect to the opening 30 in the grill. If desired, the tracks could be placed in a vertical position although this would necessitate the use of sustaining ratchets or spring tensioned guide tracks in order to sustain the panel in a selected vertical position. It will be noted in FIG. 3 that the front panel 16 is disposed at an angle with respect to the horizontal ground surface. This also affords an angular disposition of the slidable panel 17 so as to allow some of the weight to rest against the front surface 22 of the cover 14. Although this is a preferred disposition, it is obvious that the guide track means 23 and the panel 17 could be positioned in a cover member which has a front panel such as 16 in vertical alignment with the weight of the panel 17 resting on bottom track member 26. A disadvantage of this latter construction is that the panel 17 would then have a tendency to rattle in the track members 25 and 26 as the center of the gravity of the panel would not be in the direction of the wall surface 22 of cover 14.

Also preferably, an illumination source such as the combined rotisserie and light 45 is utilized in conjunction with the window 40 and the sight panel assembly. It will be appreciated that the sight panel assembly 10 could be employed without the illumination source as the heating flame could provide some illumination although not as advantageously. While one preferred illumination source is depicted, any means of illuminating the interior of the grill unit 11 can be employed whether mounted externally or inside the cover 14 or independently of a rotisserie drive mechanism.

The preferred material for forming the panel 17 is sheet steel with the panel 20 formed from heat resistant glass and suitably framed therein as previously indicated. However, if desired, extruded aluminum could be used for the frame portion 27 and the panel section 19 with heat resistant plastic materials such as plexiglass substituted for the panel 20. Further, a heat resistant plastic material such as the polycarbonates could be utilized for panel section 19 and the frame portion 27. In this manner, the nontransparent polycarbonate panel 19 and the frame portion 27 could be suitably molded in and around the plexiglass panel such as indicated by frame portion 27. This same alternative use of materials would also apply to the window 40 and associated panel 42 and the frame 43. The preferred material for forming the cover member 14 and the base member 12 of the barbecue unit 11 is cast aluminum. The track members 25 and 26 are fabricated from steel and secured as previously indicated with rivets 32 to the front panel 16. Obviously, other metals could be substituted and the track members could be welded to the cover if desired. The handle 28 is shown in conjunction with the slidable panel 17 and could be eliminated or a portion of the panel 17 turned outwardly in a flanged manner to form a suitable gripping means to move the panel from side to side. While the slidable panel member with the illumination means has been described in conjunction with a barbecue grill unit with a base and cover member, they can also be employed with any type of closure unit defining a wall means such as wall panels 16 and 36. In this instance, the closure unit would still serve as a means for enclosing items to be cooked and would include an opening such as 30.

It will thus be seen that through the present invention there is now provided a slidable sight panel for a cooking apparatus which will afford viewing of the contents of the apparatus without the necessity of constant cleaning or removal. The sight panel is simple in its construction and can be readily attached to a barbecue grill unit with a minimum amount of cost and operation. No special tooling is necessary to adapt the sight panel to a barbecue grill unit and no close tolerances are required in order to have the sight panel slide in the operative manner as previously described. To aid in the observation of the cooking grill contents, an illumination source is provided which is conveniently mounted exteriorly of the grill unit.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. An illuminated and internally visible barbecue grill unit comprising:
   - a grill housing unit including a base member and a cover member having an opening therein said cover member adapted to be positioned on the base member and opened therefrom;
   - a slidable panel member having at least two spaced apart panel sections each of which is of a dimension to cover said opening when in different positions, one of said panel sections being composed of a transparent material;
   - guide track means constructed and arranged in conjunction with said cover opening to slidably position said transparent panel section over said opening in one stage and to position said other panel section over said opening in another stage, said guide track means having a length greater than the length of said panel member; and
   - illumination means defined by a light source externally mounted on said grill housing unit and including a window member in said grill housing unit to allow light to pass from said light source into said grill unit.

2. The grill unit of claim 1 wherein said window member is positioned in said cover member and said light source is mounted on said base member.

3. The grill unit of claim 1 wherein said cover opening, said slidable panel member and said guide track means are disposed in a front panel section of said cover member.

4. The slidable sight panel as defined in claim 1 wherein said track members are positioned in a horizontal manner with respect to the normal operative position of said cover member.

5. The slidable sight panel as defined in claim 1 wherein said track members are of a generally Z-shaped configuration.

* * * * *